Sept. 11, 1962  H. T. WHITE  3,053,189
MOTOR DRIVEN PUMPS
Original Filed Dec. 22, 1959
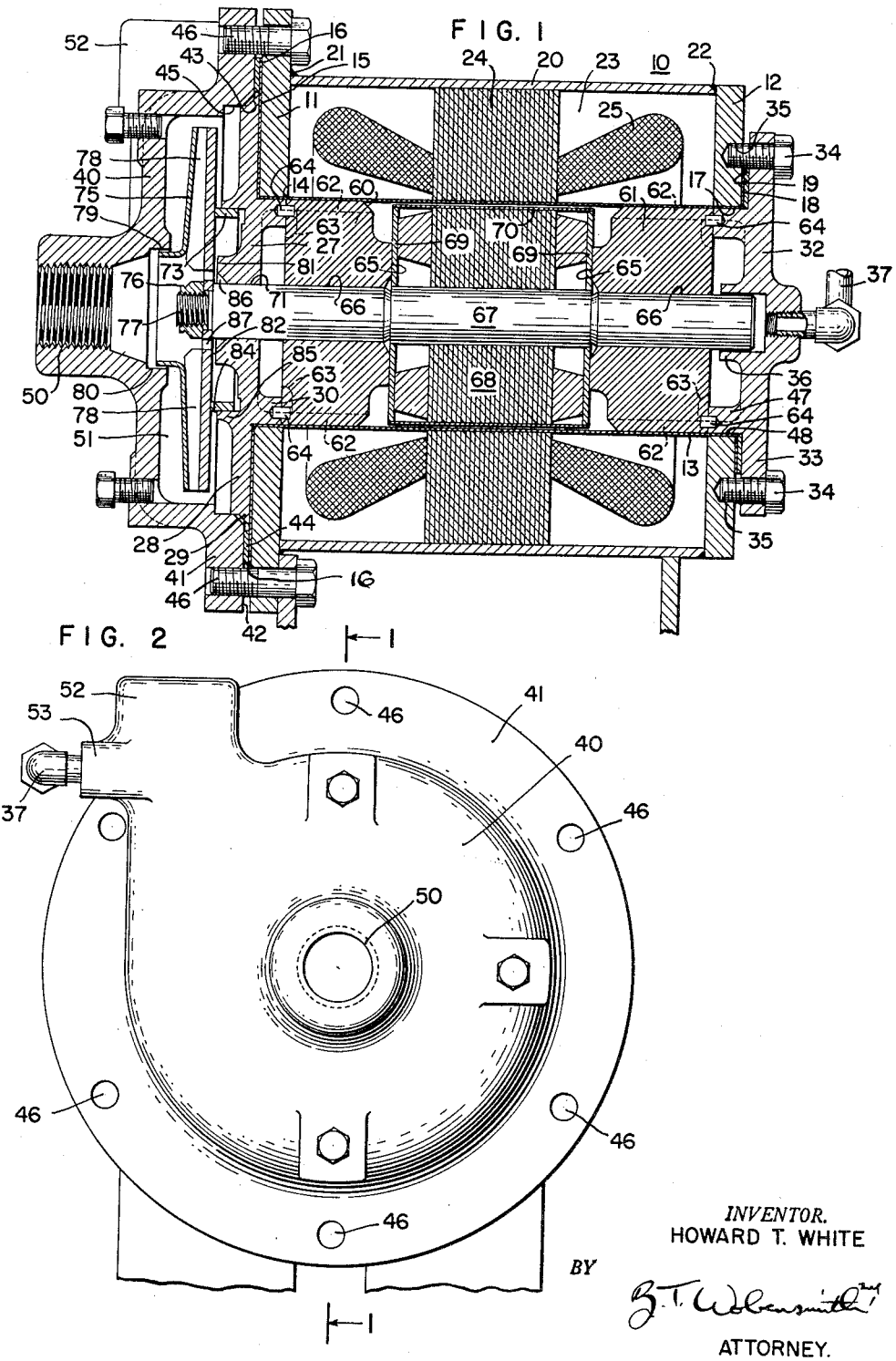
INVENTOR.
HOWARD T. WHITE
BY
ATTORNEY.

3,053,189
MOTOR DRIVEN PUMPS
Howard T. White, Melrose Park, Pa., assignor to Fostoria Corporation, Huntingdon Valley, Pa., a corporation of Ohio
Original application Dec. 22, 1959, Ser. No. 861,356. Divided and this application Oct. 25, 1960, Ser. No. 64,769
3 Claims. (Cl. 103—87)

This invention relates to motor driven pumps.

Various difficulties have heretofore been encountered in the assembling of motor driven pumps to maintain bearing alignment and to insure that the heads or end closures are in proper sealing relation.

It is the principal object of the present invention to provide an improved motor driven pump construction, in which the interior of the motor stator is employed as the basic location for assembly so that the assembled parts and the machining thereof have no deleterious effect on the shaft alignment.

It is a further object of the present invention to provide a motor driven pump in which the rotor bearings are not required to have close tolerances and are held against rotation in a simple but effective manner.

It is a further object of the present invention to provide a motor driven pump in which the thrust is accommodated in a simple but effective manner so that no thrust washers are necessary.

It is a further object of the present invention to provide a motor driven pump having an improved hydraulic thrust balance which includes an orifice of fixed size and a variable orifice.

It is a further object of the present invention to provide a motor driven pump of the character aforesaid having provisions for fluid circulation for motor rotor and stator cooling.

It is a further object of the present invention to provide a motor driven pump which can easily be made explosion proof so that the same can be employed for the pumping of highly volatile or flammable liquids with fire hazards substantially eliminated.

Other objects and advantageous features of the invention will be apparent from the description and claims.

The nature and characteristic features of the invention will be more readily understood from the following description, taken in connection with the accompanying drawings forming part thereof in which:

FIGURE 1 is a central longitudinal sectional view of a motor driven pump in accordance with the present invention and taken approximately on the line 1—1 of FIG. 2; and FIG. 2 is an end elevational view of the motor driven pump shown in FIG. 1, as seen from the left of FIG. 1.

It should, of course, be understood that the description and drawings herein are illustrative merely, and that various modifications and changes can be made in the structure disclosed without departing from the spirit of the invention.

Referring now more particularly to the drawings, a motor housing 10 is provided which includes an inner end plate 11 and an opposite inner end plate 12 in spaced relation to the end plate 11. A hollow cylindrical sleeve 13 is provided, preferably of stainless steel or other non-magnetic responsive material which is not subject to corrosion by the liquid to be pumped. The sleeve 13 extends through an opening 14 in the end plate 11 and has welded or otherwise secured thereto with a fluid tight joint a liner plate 15. The liner plate 15 can also be of any desired material which is resistant to or not subject to corrosion by the liquid being pumped and this permits the end plate 11 to be made of less expensive and more easily machined material than would be the case if the end plate 11 itself were required to be of non-corrosive material. The liner plate 15 is preferably connected at its periphery by a continuous line 16 of welding to the end plate 11.

The sleeve 13 also extends through an opening 17 in the end plate 12 and has welded or otherwise secured thereto with a fluid tight joint a liner plate 18 which is similar to but of smaller diameter than the liner plate 15. The liner plate 18 is preferably connected at its periphery by a continuous line 19 of welding to the end plate 12. The motor housing 10 also includes an outer cylindrical casing portion 20 connected by continuous annular welds 21 and 22 to the end plates 11 and 12.

A motor stator chamber 23 is provided between the end plates 11 and 12, the sleeve 13 and the outer cylindrical casing portion 20 for sealing and isolating the motor field laminations 24 and the motor field windings 25. Conductors (not shown) for energizing the windings 25 can be provided through a fluid tight seal (not shown) and connected to any suitable source of alternating current.

An inner end plate 27 is provided, having a radially outwardly extending rim 28 which is held in engagement with the liner plate 15 by a peripheral shoulder 29. The end plate 27 has a longitudinally axially extending annular rim 30 for engagement interiorly with the sleeve 13. The longitudinal axial dimension of the rim 30 is preferably such as to provide a flame trap at this location, the length of the trap being of the order of three eighths of an inch with a maximum clearance of the order of 0.0015 inch.

An outer end plate 32 is provided having a radially outwardly extending rim 33 and is held in engagement with the end plate 12 by a plurality of studs 34 which engage in blind holes 35 in the plate 12. The outer end plate 32 is provided with a longitudinally axially extending annular rim 47 for engagement interiorly in an opening 48 in the end plate 12. The longitudinal axial dimension of the facing portions of the rim 47 and opening 48 is preferably such as to provide a flame trap at this location, the length of the trap being of the order of three eighths of an inch with a maximum clearance of the order of 0.0015 inch.

The inner face of the plate 12 and the outer face of the liner plate 18 are adapted to have in engagement therewith a gasket 31, which can be made of any desired material including rubber, natural or synthetic, Teflon or other like compressible or resilient material resistant to corrosion by the liquid being pumped.

The end plate 32 is also provided with a central boss 36 the interior of which has a fluid connection 37 connected thereto.

An impeller housing 40 is provided which can be made of any desired material resistant to corrosion by the liquid being pumped and for this purpose can be made of stainless steel, titanium or the like. The impeller housing 40 has a flange 41 with an inner diametrically extending face 42 and inclined face portion 43 which are adapted to engage with a gasket 44 which is also in engagement with the liner plate 15 of the end plate 11. The gasket 44 can be made of any desired material including rubber, natural or synthetic, Teflon, or other like compressible or resilient material resistant to corrosion by the liquid being pumped. The impeller housing 40 has an annular interior recess 45 for the reception of the periphery of the end plate 11.

The impeller housing 40 is held in fixed and fluid tight relation to the end plate 11 and with the inner end plate 27 clamped in position by a plurality of studs 46.

The impeller housing 40 has an axially disposed fluid inlet 50, preferably has an internal impeller chamber 51 of scroll shape and has a fluid delivery connection 52.

A fluid connection 53 can also be provided for delivery of a limited amount of fluid to the fluid connection 37.

Within the sleeve 13, substantially cylindrical bearing blocks 60 and 61 of graphite or the like are provided having peripheral portions for engagement with the interior of the sleeve 13, the bearing blocks 60 and 61 having grooves 62 extending along their outer peripheries in communication with end grooves 63 on their outer end faces to permit fluid flow. The bearing blocks 60 and 61 are preferably retained in position and against rotation by axially extending pins 64 in engagement therewith and with the end plates 27 and 32 respectively. The bearing blocks 60 and 61 have inner end facing portions 65 which serve as thrust faces, as hereinafter explained. The bearing blocks 60 and 61 have longitudinally axially extending bearing openings 66 in which a shaft 67 is rotatably supported.

The shaft 67, intermediate the bearing blocks 60 and 61, has a motor rotor 68 secured thereon of any desired type and preferably of the short circuited type. The motor rotor 68 is preferably within an enclosure which includes rotor end cover plates 69 welded to the shaft 67 at their inner portions and welded at their peripheries to a cylindrical rotor cover 70. The rotor end cover plates 69 are adapted to engage the facing portions 65 of the bearing blocks 60 and 61 for accommodating the thrust on the shaft 67.

The shaft 67 extends through an opening 71 in the end plate 27 and also into the interior of the boss 36 carried by the end plate 32. The facing portions of the shaft 67 with the opening 71 and the boss 36 have a longitudinal dimension of the order of three eighths of an inch and a maximum clearance of the order of 0.0007 inch.

The shaft 67 extends into the impeller housing 40 and has an impeller 75 mounted thereon and held in position by a nut 76 in engagement with a threaded terminal end 77 of the shaft 67. The impeller 75 preferably has a plurality of vanes 78 and has a shroud 79 which is received within a recess 80 formed within the impeller housing 40 to permit a limited longitudinal axial movement hereinafter referred to. The impeller 75 also has an end face 82 which provides with an end face 81 of the end plate 27 a variable orifice for purposes to be explained. The impeller 75 has a ring 73 secured thereto with an outer peripheral face 84 in closely spaced relation to a flange 85 on the inner end plate 27 to provide a constant orifice, for purposes to be explained.

Interiorly of the face 81, a groove 86 is provided in communication with the clearance between the shaft 67 and the end plate 27 at the opening 71 and also with a plurality of return ports 87 in the impeller 75 for the return of liquid at a low pressure portion of the impeller 75.

The mode of operation will now be pointed out.

Upon energization of the windings 25 a rotary field is set up in the laminations 24 which is effective on the motor rotor 68 for rotating the shaft 67. Fluid to be pumped is supplied to the fluid inlet connection 50 and enters the impeller 75, is directed by the impeller 75 to the interior scroll 51 of the impeller housing 40, and thence to the delivery connection 52.

A portion of the liquid is delivered to the fluid connection 53 and the fluid connection 37 and passes to the interior of the boss 36, through the clearance space between the shaft 67 and the boss 36, through the passageway 63 and passageways 62 to the inner end of the bearing block 61.

A portion of the liquid comes into contact with the end plate 69 for lubricating the contacting portions of the end plate 69 and the bearing block 61.

The liquid then passes through the clearance space between the rotor enclosure 70 and the sleeve 13 to the other end of the motor rotor 68, into contact with the facing portions of the end plate 69 and the bearing block 60.

The liquid then passes through the passageways 62 and the passageways 63 and the clearance space between the opening 71 and the shaft 67 and through the return ports 87 to a low pressure portion of the impeller 75.

Liquid at high pressure passes to and through the orifice between the face 84 of the ring 73 and the interior of the rim 85 and the space between the faces 81 and 82 and then through the return ports 87 to a low pressure portion of the impeller 75.

The restricted passageway between the rim 85 and the surface 84 serves as a fixed orifice and the space between the faces 81 and 82 serves as a variable orifice to provide a balancing action.

The impeller 75 has pressure effective thereon in the impeller chamber 51 in both directions longitudinally axially considered. The ring 73 and rim 85 which provide a fixed orifice, as previously indicated, and the faces 81 and 82 which provide a variable orifice separate an annular pressure balancing chamber between the orifices in which a variable force is applied longitudinally axially on the impeller 75 as determined by the pressure conditions existing therein. If the space between the faces 81 and 82 is decreased, then pressure, supplied through the fixed orifice, tends to build up in the balancing chamber thereby to exert pressure toward the left in FIG. 1. This pressure when of sufficient magnitude to move or permit the movement of the impeller 75 toward the left tends to increase the size of the variable orifice so that the pressure of the fluid is reduced by discharge therethrough to the ports 87, thus permitting movement toward the right. The control of the pressure in this manner tends to arrive at an equilibrium or balanced condition with a minimum of movement to restore the balanced condition.

The fluid circulating in the interior of the sleeve 13 and over and around the bearing blocks 60 and 61 is effective for cooling while at the same time a part of the heat released in connection with the motor operation is also removed by the circulating fluid.

The flame traps provided between the surface 71 and the shaft 67, between the rim 30 and the sleeve 13, between the rim 47 and the opening 48, and between the shaft 67 and boss 36, serve to permit the adiabatic expansion of any gaseous material tending to pass therealong with resultant cooling which prevents the propagation of flame through these restricted passageways. The construction thus provided insures a flame proof structure with resultant higher safety qualities.

It will be particularly noted that the motor driven pump herein disclosed is constructed and assembled so that the alignment of the end plates 11, 12, 27 and 32 and the impeller housing 40 does not affect the alignment of the bearings for the shaft 67 provided by the bearing blocks 60 and 61. This decreases the cost of manufacturing while still retaining all the advantages of the isolated stator and enclosed motor rotor construction.

This application is a division of my prior application filed December 22, 1959, Serial No. 861,356.

I claim:

1. In a motor driven pump, a pump housing having an impeller chamber with an impeller therein, a motor housing connected to said pump housing and having an interior sleeve providing a motor stator chamber, a motor stator in said motor stator chamber, the interior of said sleeve providing a motor rotor chamber, an end plate separating said impeller chamber and said motor rotor chamber, spaced bearing members disposed within said sleeve, a shaft journaled in said bearing members and extending into said impeller chamber, said impeller being mounted on said shaft in said impeller chamber and having a transverse end face in facing relation to said motor housing, a motor rotor on said shaft between said bearing members, an annular flange on said end plate and an annular ring extending from said end face of said impeller extending in telescoping relation and providing with said flange and an outer annular orifice, said end plate having a hub with a transverse end face providing with said first mentioned end face an inner annular orifice, one of said orifices being a fixed orifice and the other of said orifices being a variable orifice, the space between said orifices providing a pressure balancing chamber for application of a longitudinal axial positioning force on said impeller.

2. In a motor driven pump, a pump housing having an impeller chamber with an impeller therein, a motor housing connected to said pump housing and having an interior sleeve providing a motor stator chamber, a motor stator in said motor stator chamber, the interior of said sleeve providing a motor rotor chamber, an end plate separating said impeller chamber and said motor rotor chamber, spaced bearing members disposed within said sleeve, a shaft rotatably journaled in said bearing members and extending into said impeller chamber, said impeller being mounted on said shaft in said impeller chamber and having a transverse end face in facing relation to said motor housing, a motor rotor on said shaft between said bearing members, a longitudinally axially extending annular rim on a portion of said end plate extending into said impeller chamber, said impeller having a coacting annular ring carried thereon and extending from said end face toward said motor housing and providing with said rim a fixed orifice, and an annular face portion on one of said housings in facing relation to an annular face portion of said end face of said impeller and providing therewith a variable orifice, the annular space between said orifices providing a pressure balancing chamber for application of a longitudinal axial positioning force on said impeller.

3. In a motor driven pump, a pump housing having an impeller chamber with an impeller therein, a motor housing connected to said pump housing and having an interior sleeve providing a motor stator chamber, a motor stator in said motor stator chamber, the interior of said sleeve providing a motor rotor chamber, an end plate separating said impeller chamber and said motor rotor chamber, spaced bearing members disposed within said sleeve, a shaft rotatably journaled in said bearing members and extending into said impeller chamber, said impeller being mounted on said shaft shaft in said impeller chamber and having a transverse end face in facing relation to said motor housing, a motor rotor on said shaft between said bearing members, a longitudinally axially extending annular rim on said end plate extending into said impeller chamber, said impeller chamber having a coacting annular ring carried thereon extending from said transverse end face in telescoping relation to said rim and providing with said rim a fixed orifice, an annular face portion on said end plate radially inwardly disposed with respect to said rim and in facing relation to a portion of said transverse face of said impeller and providing therewith a variable orifice, the annular space between said orifices providing a pressure balancing chamber for application of a longitudinal axial positioning force on said impeller, and a fluid pressure discharge connection in said impeller communicating with said variable orifice for the delivery of fluid to the inlet of said impeller.

References Cited in the file of this patent
UNITED STATES PATENTS

| | | |
|---|---|---|
| 958,612 | Eyermann | May 17, 1910 |
| 1,009,928 | Paulsmeier | Nov. 28, 1911 |
| 1,105,807 | Macneill | Aug. 4, 1914 |
| 1,180,602 | Pfau | Apr. 25, 1916 |
| 2,741,990 | White | Apr. 17, 1956 |
| 2,768,584 | Nicol et al. | Oct. 30, 1956 |